US009721258B2

(12) United States Patent
Cahn

(10) Patent No.: US 9,721,258 B2
(45) Date of Patent: Aug. 1, 2017

(54) VALIDATION OF CRYOGENICALLY TREATED ARTICLES

(75) Inventor: Jack Cahn, Boulder, CO (US)

(73) Assignee: AMS Corporation, Boulder, CO (US)

( * ) Notice: Subject to any disclaimer, the term of this patent is extended or adjusted under 35 U.S.C. 154(b) by 756 days.

(21) Appl. No.: 13/219,239

(22) Filed: Aug. 26, 2011

(65) Prior Publication Data

US 2012/0177081 A1 Jul. 12, 2012

Related U.S. Application Data

(60) Provisional application No. 61/427,386, filed on Dec. 27, 2010, provisional application No. 61/445,091, filed on Feb. 22, 2011.

(51) Int. Cl.
*G06Q 99/00* (2006.01)
*G06Q 30/00* (2012.01)

(52) U.S. Cl.
CPC .................. *G06Q 30/018* (2013.01)

(58) Field of Classification Search
USPC ................ 148/508, 509, 510, 511, 577, 578
See application file for complete search history.

(56) References Cited

U.S. PATENT DOCUMENTS 3,878,726 A * 4/1975 Hamatani ................. 73/863.91
3,891,477 A 6/1975 Lance et al.
4,482,005 A 11/1984 Voorhees
4,739,622 A 4/1988 Smith
5,174,122 A 12/1992 Levine
5,259,200 A 11/1993 Kamody
5,865,913 A 2/1999 Paulin
5,875,636 A 3/1999 Kamody
7,464,593 B1 12/2008 Masyada
7,744,707 B2 6/2010 Brunson
2012/0177081 A1 * 7/2012 Cahn ............................ 374/10

* cited by examiner

*Primary Examiner* — Scott Kastler
(74) *Attorney, Agent, or Firm* — Marsh Fischmann & Breyfogle LLP; Jonathon A. Szumny

(57) ABSTRACT

Embodiments validate cryogenic processing of metal-matrix validation articles according to destructive and/or non-destructive testing of witness articles. For example, validation can certify that the validation article has undergone a particular cryogenic treatment protocol, resulting in validated and/or certified enhancements in wear characteristics, resistance to corrosion, increases in electrochemical bonding of surface treatments, increases in theoretical useable lifespan, etc. According to some embodiments, processing results are validated by generating witness results from destructive and/or non-destructive testing of the witness articles subsequent to deep-cryogenic treatment. The processing (e.g., including witness results and/or analysis thereof) may then be entered into a computer-controlled, parametric analysis system that generates absolute and comparative validation and/or certification of the validation articles.

3 Claims, 5 Drawing Sheets

VALIDATION OF CRYOGENICALLY TREATED ARTICLES

CROSS-REFERENCES

This application claims priority from U.S. Provisional Patent Application No. 61/427,386, filed Dec. 27, 2010, entitled "PROCESS AND METHOD FOR THE TESTING, VALIDATION AND CERTIFICATION OF CRYOGENIC TREATMENT TO METAL AND METAL MATRIX OBJECTS," and from U.S. Provisional Patent Application No. 61/445,091, filed Feb. 22, 2011, entitled "CRYOGENIC TREATMENT OF US MILITARY USE METAL ITEMS," both of which are hereby incorporated by reference, as if set forth in full in this document, for all purposes.

FIELD

Embodiments of the present invention relate generally to cryogenic processing of materials, and, more particularly, to validation and/or certification of cryogenically treated metal-matrix articles.

BACKGROUND

Metal articles are ubiquitous in both civilian and military applications. For example, the U.S. military has used metal parts and objects for operational purposes since its inception. Tanks, ships, planes, armament, munitions and weaponry are several well-recognized platforms that include discrete parts, sub-assemblies, assemblies and system-level articles manufactured or formed from metal and metal-matrix materials. These articles typically have limited lifespan due to mechanical, electrical, chemical, and/or physical breakdown of one or more critical components. These limitations may, for instance, manifest as one or more of wear, corrosion, or surface finish degradation.

Standards and procedures exist for most manufacturing methods used in production of metal parts supplied to the military, however there is no MIL-STD, procedure, special process initiative, or engineering document that explicitly governs cryogenic processing or cryogenic treatment of metal parts for use by the US military. This absence of procedure has tended to severely limit the application of this technology, particularly in US military contexts.

Various techniques are known for cryogenic processing of materials to provide stress relief, enhance mechanical wear characteristics, reduce corrosion, and/or otherwise improve metallurgic, mechanical, electrical, and/or other properties of metal-matrix objects. Some of these techniques for and benefits of cryogenic processing are described, for example, in U.S. Pat. No. 3,891,477, issued June 1975 to Lance; U.S. Pat. No. 5,865,913, issued February 1999 to Paulin, et al.; U.S. Pat. No. 5,259,200, issued November 1993 to Karmody; U.S. Pat. No. 4,739,622, issued April 1988 to Smith; U.S. Pat. No. 5,174,122, issued December 1992 to Levine; U.S. Pat. No. 4,482,005, issued November 1984 to Voorhees; U.S. Pat. No. 7,744,707, issued June 2010 to Brunson; and U.S. Pat. No. 7,464,593, issued December 2008 to Masyada.

Various types of systems are also available for facilitating the cryogenic processing of metal-matrix materials. Some of these systems are described in certain of the references listed above. The systems typically facilitate a cryogenic treatment protocol. For example, the treatment protocol includes ramp down, cold soak, and ramp up operational steps, and the systems may allow for setting, controlling and monitoring temperature and time variables dictated by the various treatment protocols (e.g., by use of a thermostat, a programmable logic controller, a temperature recording device, etc.). Some treatment protocols further include one or more post-cryogenic treatment (e.g., tempering) phases, for example, to reduce embrittlement of the cryogenically treated material. The various systems may perform different steps of the protocol in different ways. For example, the cold soak stage may be implemented as a wet soak (i.e., a material undergoing treatment is fully or partially immersed in a cryogenic liquid) or a dry soak (i.e., a material undergoing treatment is fully or partially immersed in vapors of a cryogenic liquid).

The science behind the cryogenic effect is generally ascribed to changes within the crystalline lattice structure that occur following extended cold treatment, although the specific mechanism resulting in the cryogenic effect has yet to be fully explained. Observed under scanning electron microscopes, when material is exposed for a period of time at or near −300° F., primary and secondary carbides precipitate and nucleate within the material matrix and austenitic steel transforms into martensitic tetragonal structure without embrittlement, promoting stress relief, more uniform grain structure, increased densification and reduced crack initiation. Cryogenically treated material demonstrates significant reduction in abrasion and wear characteristics and corrosion effect and the process has been successfully used, for example, in tooling, engine components, gears, bearings and other industrial applications.

Processing protocols vary widely, for example, in relation to differences in material alloy, item weight, surface treatment, and matrix composition. These processing protocols are determined according to trial and error and limited empirical observations without guidance from any common or industry-recognized database that correlates a given processing protocol to a proven performance outcome. Further, there tends to be little industry oversight and, until recently, little relevant scientific data to support particular treatment methodologies. Accordingly, manufacturers or providers of cryogenic equipment and services have tended to differentiate themselves by closely guarding the time and temperature variables that form the content of a processing recipe. This has contributed to a general perception among the scientific community that the treatment process is questionable in effect and unreliable—in spite of industry-wide usage that argues and demonstrates via actual performance to the contrary.

BRIEF SUMMARY

Among other things, embodiments described herein provide systems and methods for validation of cryogenically treated metal-matrix validation articles (e.g., metal parts undergoing cryogenic treatment) according to destructive and/or non-destructive testing of witness articles. Some embodiments validate that the validation article has undergone a particular cryogenic treatment protocol and/or that the treatment of the validation article has resulted in particular enhancements in wear characteristics, resistance to corrosion, increases in electrochemical bonding of surface treatments, increases in theoretical useable lifespan, etc.

For example, a witness article is produced to substantially represent one or more metallurgic characteristics of the validation article. The witness article and validation article (e.g., typically a batch of similar or identical validation articles) are cryogenically processed together according to a common treatment protocol. After processing, witness results are generated by destructive and/or non-destructive testing of the witness articles subsequent to cryogenic treatment. The witness results may then be entered into a computer-controlled, parametric analysis system that generates absolute and comparative validation results applicable to validation of the validation article. The validation article may then be validated according to the validation results.

According to one set of embodiments, a method is provided for validation of cryogenically treated articles. The method includes identifying a set of metallurgic characteristics of a metal-matrix treatment article; producing a witness article to correlate to at least one of the set of metallurgic characteristics of the treatment article; cryogenically treating the treatment article and the witness article according to a predetermined treatment protocol; testing a metallurgic characteristic of the witness article according to a predetermined test protocol to generate witness results; and validating the cryogenic treatment of the treatment article according to the witness results.

According to another set of embodiments, another method is provided for validation of cryogenically treated articles. The method includes testing a metallurgic characteristic of a witness article according to a predetermined test protocol to generate witness results, the witness article produced to correlate to a set of metallurgic characteristics of a metal-matrix treatment article, the testing being performed subsequent to cryogenic treatment of the treatment article and the witness article according to a common treatment protocol; and validating the cryogenic treatment of the treatment article according to the witness results.

BRIEF DESCRIPTION OF THE DRAWINGS

The present disclosure is described in conjunction with the appended figures.

Figure 1:
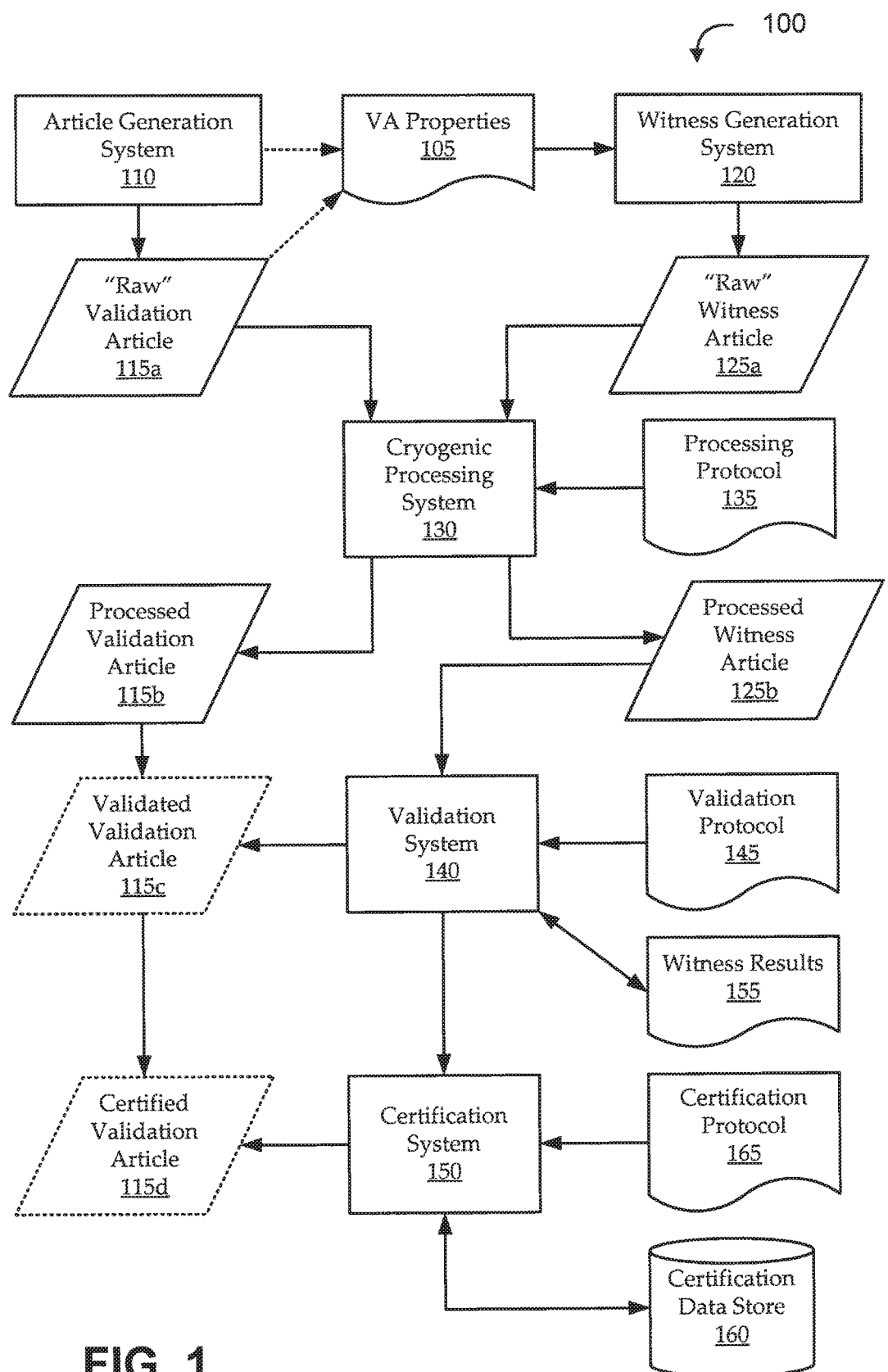
FIG. 1 shows a cryogenic processing environment, according to various embodiments.

In the appended figures, similar components and/or features may have the same reference label. Further, various components of the same type may be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention.

Various techniques are known for cryogenic processing of metal-matrix materials. Typically, these techniques involve changing the temperature of a metal-matrix object by controlled amounts and over controlled amounts of time according to a cryogenic treatment protocol. While there is apparently still some disagreement as to the exact scientific processes at work, it is generally accepted that the treatment provides stress relief, enhanced mechanical wear characteristics, reduced susceptibility to corrosion, fatigue crack resistance, reduced fracture characteristics, improved surface finish, and/or other improvements in metallurgic, mechanical, electrical, and/or other properties of the treated metal-matrix objects over their untreated counterparts.

Throughout the industry, there are many variations in the cryogenic processing protocols and varying claims of treatment outcomes. However, the treatment protocols tend to be formulated by trial and error, and the claims are often based on limited empirical observations and anecdote without support from scientific or repeatable, experimental data. For example, the inventor is unaware of any common or industry-recognized database that correlates a given processing protocol to a proven performance outcome. Accordingly, even if a processing entity guarantees that an article has been processed according to a particular protocol, it may be difficult or impossible to independently and reliably validate that the treatment did indeed occur or that the treatment resulted in any particular desired performance outcome.

This type of validation may be difficult for a number of reasons. One reason, as discussed above, may be the lack of agreement as to the exact science behind the treatment and its effects. Another reason may be the closely-guarded nature of the specific treatment recipes used by the various processing entities. Yet another reason is that treatment outcomes (e.g., performance outcomes) may vary widely with differences in article material, geometry, prior processing (e.g., if the article underwent a heat-treat process prior to the cryogenic treatment), surface treatment, etc. Still another reason that independent and reliable validation may be difficult is that many effects of the cryogenic treatment can only be reliably tested using destructive testing.

Embodiments described herein provide systems and methods for validation of cryogenically treated articles using a witness artifact. As used herein, an article (e.g., a part, component, subsystem, system, etc.) undergoing cryogenic processing for ultimate use by an end consumer is referred to as a "validation article." The validation article is validated according to a representative article that undergoes the same or similar cryogenic treatment, referred to herein as the "witness article." Each of the validation articles and witness articles is a metal-matrix article. As used herein, the terms "metal," "metal-matrix," and the like are intended generally to include any metal material or any composite material where at least one of its constituent parts is metal. For example, the metal of the article may be a monolithic matrix material into which other metals, ceramics, organic compounds, and/or other constituent parts are embedded; or the metal may be a reinforcement constituent to a ceramic composite (e.g., a "cermet") or other material.

Various techniques are described below for using the witness article to validate one or more validation articles. According to some embodiments, the witness article is subjected to destructive and/or non-destructive testing to generate witness results. These results can then be used as a substitute (e.g., an analog) to direct testing of the validation articles themselves, for example, to validate that the validation article has undergone a particular cryogenic treatment protocol and/or that the treatment of the validation article has resulted in particular enhancements in wear characteristics, resistance to corrosion, increases in electrochemical bonding of surface treatments, increases in theoretical useable lifespan, etc.

Turning first to FIG. 1, a cryogenic processing environment 100 is shown, according to various embodiments. The cryogenic processing environment 100 includes an article generation system 110, a witness generation system 120, a cryogenic processing system 130, a validation system 140, and a certification system 150. The various systems are illustrated to perform certain functionality. It will be appreciated that other embodiments of cryogenic processing environments 100 include only some of these component systems. Further, in some embodiments, multiple systems are combined into a single system or a single system may be considered as multiple subsystems. Even further, functionality described with reference to one system may, in fact, be implemented by a different system without departing from the scope of embodiments. Accordingly, the descriptions of the component systems is intended to provide clarity to the description and should not be construed as limiting the various ways in which the functionality can be implemented by other embodiments.

As discussed above, techniques described herein for validation of cryogenic processing use one or more validation articles 115 and one or more witness articles 125. The article generation system 110 generates the validation articles 115. In some cases, the validation articles 115 are manufactured within the context of the cryogenic processing environment 100, while, in other cases, the validation articles 115 are received at the cryogenic processing environment 100. For example, the validation articles 115 may be parts manufactured by some third party either immediately prior or appreciably prior to receipt at the cryogenic processing environment 100 for processing.

When the validation articles 115 are manufactured by the article generation system 110 or received at the cryogenic processing environment 100, they are referred to herein as "raw" validation articles 115a. The term "raw" is intended to indicate that the article has not undergone the cryogenic processing being validated in the context of the cryogenic processing environment 100. However, the "raw" validation articles 115 may have undergone heat-treating, surface finishing, tempering, cryogenic processing, and/or any other type of processing prior to the processing being validated in the context of the cryogenic processing environment 100.

The validation articles 115 can be any type of metal-matrix articles. For example, the validation articles 115 can include all or parts of guns, brakes, tools, dyes, etc. The validation articles 115 may further be for use in civilian, military, commercial, industrial, residential, and/or any other context. Even further, the validation articles 115 may be unused, or newly manufactured, or previously used.

Notably, the validation articles 115 are associated with validation article properties 105. The validation article properties 105 may include any properties that can affect or be affected by techniques described herein. Some validation article properties 105 may relate to metallurgical properties of the articles, such as the material from which the validation articles 115 are manufactured, any previous treatment applied to the validation articles 115 (e.g., heat treatments), certain geometries, grain type and/or direction, metal-matrix components, etc. Other validation article properties 105 may relate to strength properties, electrical properties, surface treatments, and/or any other useful characteristics of the validation articles 115.

In cases where the validation articles 115 are manufactured by the article generation system 110 in the context of the cryogenic processing environment 100, the validation article properties 105 may be derived from the specifications used to manufacture the validation articles 115. In cases where the validation articles 115 are received by the cryogenic processing environment 100, the validation article properties 105 may be received in association with the validation articles 115 (e.g., received as or derived from the manufacturing specifications, data relating to the type of article or manufacturing environment, etc.) or may be derived from testing of the article.

As will be described more fully below, embodiments implement various validation and related techniques using one or more witness articles 125. For the witness articles 125 to be useful as a validation witness of the cryogenic processing of the validation articles 115, it may be desirable for the witness articles 125 to substantially manifest one or more of the validation article properties 105. Depending on the level and type of validation desired, different validation article properties 105 may be manifested in the witness articles 125 and to different levels of confidence. For example, at one extreme, it may be desirable to match the geometry, material, previous treatments, and other characteristics of the validation articles 115 as much as possible in the witness articles 125 (i.e., it may not be possible to perfectly match all the characteristics, for example, due to slight variations in materials, environment, etc.). In other examples, the witness articles 125 may be manufactured from similar stock material as that used for the validation articles 115, but manifest wholly different surface treatments, geometries, etc.

The witness articles 125 may be generated using the witness generation system 120. In some embodiments, the witness generation system 120 is the same system as the article generation system 110. In other embodiments, the article generation system 110 and the witness generation system 120 have the same or different manufacturing capabilities, the same or different owners or operators, etc.

In some cases, witness articles 125 are generated along with (e.g., concurrently with and/or using the same manufacturing process as) the validation articles 115. In one embodiment, during the manufacturing of the validation articles 115, the same material is used to generate one or more witness articles 125, and those witness articles 125 are subjected to some or all of the same manufacturing processes (e.g., though the final geometry of the witness articles 125 may or may not be the same as that of the validation articles 115). In other embodiments, the same or a similar manufacturing process is used, though it is performed separately (e.g., with respect to time and/or geography, etc.) from the manufacturing of the validation articles 115.

Many types of witness articles 125 are possible. The witness articles 125 may be created from similar material, alloy, metal-matrix, metallurgic composition, etc., of that of the validation articles 115 being cryogenically processed. The witness articles 125 may be investment cast, forged, milled, turned, precision ground, sintered, hot isostatically pressed, metal injection molded, nanoscale processed, cryo milled, waterjet cut, electrical discharge machined, laser cut, CNC vertically or horizontally machined, manually machined or processed in any way to create the witness articles 125 in a particular size, form, shape, or geometric configuration. The witness articles 125 can be heat treated at any time using any known MIL Standard, SAE, ASTM, commercial or industrial recognized and established heat treatment process to alter the physical, and sometimes chemical properties of the material including those processes of annealing, hardening and tempering, quenching, precipitation hardening, selective hardening and case hardening. Some witness articles 125 may be surface finished, ground, or polished to their final appearance, roughness, and topography. Certain witness articles 125 are cleaned or prepared in any manner using any solvent, chemical, ultrasonic cleaner, bead blast cabinet, degreasing chemical, vibration cleaning, commercial or specialized abrasive media, passivation method or process in accordance with any known MIL Standard, SAE or ASTM recognized and established method to achieve material cleaning or preparation. Also or alternatively, the witness articles 125 can be surface treated to retard corrosion or reduce mechanical wear and abrasion using such processes including anodizing, manganese or zinc phosphate, CARC paint, chemical plating, oxidizing, electro-deposition or electro-plating. In some implementations, some witness articles 125 are segregated from a designated control group of witness articles 125 (e.g., and positively and permanently marked or identified, in certain cases), so that the control group witness articles 125 are not cryogenically processed.

In a military context, witness articles 125 can be manufactured and/or inspected per various military specifications. For example, in certain military applications, manufacturing processes of all witness articles 125 may be required to meet MIL-W-13855 and ANSI Y14.5-1973, and quality assurance provision requirements per drawing 12993884 may apply. Further, specific types of witness articles 125 may have additional requirements in certain cases. For the sake of illustration, billet-turned witness articles 125 can be created from round-bar stock to replicate uniaxial grain direction, and billet-machined witness articles 125 may be created from cut bar, plate, or flat stock, less heat affected zones. Investment cast, sintered or forged witness articles 125 can be created per applicable print military standards (MIL-STD) or American Society for Testing and Materials standards (ASTM-STD). Investment cast witness articles 125 can be inspected per AMS-STD-2175, Class 3, Grade B. Various other types of inspection are also available, such as mag particle inspection per ASTM E1444, soundness requirements; wrought material inspection per MIL-STD-1907, Grade A; castings inspection per MIL-STD-1907, Grade B; etc.

In some cases, it is desirable to trace the witness article 125 material to a heat and lot of a compliant supplier (e.g., an International Traffic in Arms Regulations (ITAR) compliant material alloy supplier). The compliance may, in certain instances, require that chemical and physical material certifications are retained and available for inspection by relevant inspectors. For example, the certifications may be retained for Defense Contract Management Agency (DCMA) quality assurance inspection, and documents may be retained or archived on-site per an applicable International Standards Organization (ISO) standard governing the test facility.

According to some embodiments, turned or machined witness articles 125 are formed in "as cut" condition and are not surface ground, except where specifically desirable to simulate a similar characteristic of a validation article 115 (e.g., according to its validation article properties 105). In certain embodiments, witness articles 125 are cast, forged, sintered, machined, turned, wire EDM, laser cut or diamond saw cut to final flatness and parallelism tolerances of 0.0005-inches minimum. Some embodiments of witness articles 125 are manufactured to simulate heat treat conditions and/or hardness characteristics of the corresponding validation articles 115, while other embodiments of witness articles 125 are manufactured to a default value (e.g., according to MIL-H-6875 austenitize, quench and temper at prescribed temperatures and heat treat).

Certain embodiments of witness articles 125 are manufactured to have a surface finish that is within a predetermined tolerance of the corresponding surface finish of the validation articles 115 (e.g., +/−10 points Ra to 75% per volume of corresponding validation article properties 105). Alternatively (e.g., if there is no surface finish requirement), the witness articles 125 can be manufactured with a default surface finish value (e.g., 125 Ra). Further, surface finish coatings of the witness articles 125 can be manufactured according to a predetermined tolerance (e.g., 50% per volume according to the validation article properties 105), or to some default value. In some cases, surface finish coatings are required to meet additional standards. For example, witness articles 125 used in some military contexts may be required to meet MIL-STDs where applicable to actual parts by known National Stock Number (NSN) as well as specific test standards per MIL-STD-171, where applicable (e.g., a lot of actual parts meeting or exceeding 50% by volume with a final protective finish of 5.3.1.2 of MIL-STD-171 may have to meet the requirement of PS-16232 governing acceptance criteria for manganese phosphate coating).

As described above, the role of the witness articles 125 is to manifest properties that are at least similar enough to those of the validation articles 115 so that testing of the witness articles 125 can be used as an analog for testing of the validation articles 115. Accordingly, some embodiments of the witness articles 125 are further generated according to down-stream testing and/or other uses. In some cases, it may be desirable or necessary to have certain geometries for the witness articles 125 to facilitate a particular destructive or non-destructive testing procedure. For example, "pin-on-plate" testing may require that the witness article 125 is a plate, tensile strength testing may require that the witness article 125 is "dog-bone" shaped, etc. Electrical testing, usage testing, etc., may similarly require certain types of geometrical features to be present.

It will now be appreciated that, regardless of how and when the validation articles 115 and the witness articles 125 are generated (e.g., including manufacturing, receiving, etc.), the cryogenic processing environment 100 has access to one or more raw validation articles 115a and one or more raw witness articles 125a that substantially manifest at least a portion of the validation article properties 105. The raw validation articles 115a and raw witness articles 125a are cryogenically processed by the cryogenic processing system 130 to generate "processed" validation articles 115b and "processed" witness articles 125b, respectively. Various embodiments cryogenically process the articles according to different processing protocols 135 (also referred to as processing "profiles").

Many different variations of processing protocols 135 are available, and many different types of cryogenic processing systems 130 may be used to facilitate those different processing protocols 135. For example, typical cryogenic processing protocols 135 include ramp down, controlled soak, and ramp up stages. Some processing protocols 135 further include one or more snap tempering or tempering sequences. For example, the temperature of the articles may be lowered to around minus-320-degrees Fahrenheit and raised for tempering cycles to around 650-degrees Fahrenheit. The various stages of the processing protocols 135 can be selected in any useful way, for example, corresponding to validation article properties 105, desired processing results, capabilities of the cryogenic processing system 130, customer specifications, certification requirements, etc.

Each stage of the processing protocols 135 may be conducted in various ways, for example, using continuous- or linear-rate-controlled, time- and temperature-dependent processing recipes. Different cryogenic processing systems 130 may control temperatures and/or rates of temperature changes in different ways. For example, a cryogenic processing system 130 may control the temperature of the articles being processed by controlled immersion of the articles in a cryogenic liquid (e.g., liquid nitrogen) or vapors of a cryogenic liquid, by controlling the proximity of the articles to a cryogenic liquid or other cooling source, by using liquids and/or gases to change the temperature of an outer chamber in order to indirectly affect the temperature of an inner processing chamber, etc. Further, various potentiometers, clocks, mechanisms, and other components may be included to facilitate the processing. In some embodiments, the cryogenic processing system 130 includes multiple subsystems. For example, tempering may be performed in the same or a different subsystem from the one used for cold soaking, the ramp up phase may involve placing the articles in a separate ambient-temperature location for some time, etc.

Some processing protocols 135 include further processing of the material prior to or subsequent to the cryogenic processing. For example, the witness articles 125 and/or validation articles 115 can be post-process surface finished to include coating, paint, anodizing, phosphating, plating, electrofinishing, vapor-, ion- or electro-deposition application in any way. These types of additional processing may be dictated by the processing protocols 135, for example to match processing of the witness articles 125 and validation articles 115 within the processing lot and/or in compliance with the MIL-STD, ASTM, ASM or industry standard governing the application of those types of finishes on items that have been or will be cryogenically processed. Some of these and/or other embodiments of processing protocols 135 are described more fully below.

As described above, embodiments validate the cryogenic processing of the articles. Validation may include validating that the cryogenic processing occurred according to a desired processing protocol 135, that the processing resulted in particular processing results (e.g., particular metallurgical, electrical, and/or other properties, or changes thereof), etc. The validation is performed by the validation system 140 according to a validation protocol 145. Embodiments of the validation protocol 145 include destructive and/or non-destructive testing. The validation protocol 145 may also include comparison data, testing orders and/or parameters, different protocols for different witness articles 125, etc. Some embodiments of validation protocols 145 are described more fully below.

Any non-destructive testing dictated by the validation protocol 145 can be performed on either or both of the witness articles 125 or the validation articles 115, according to various embodiments. It may be desirable to perform the non-destructive testing directly on the validation articles 115, for example, to yield greater certainty of results, where the non-destructive testing relates to validation article properties 105 or other characteristics not manifested by the witness articles 125 (e.g., a particular surface finish, a particular geometric characteristic, etc.), etc. On the other hand, it may be desirable to perform the non-destructive testing on the witness articles 125, for example, to facilitate consistency across the non-destructive and any destructive testing (by using the witness articles 125 for both, rather than different articles for each), to further validate that the witness articles 125 sufficiently manifest particular ones of the validation article properties 105, etc.

Any destructive testing dictated by the validation protocol 145 is typically performed by the validation system 140 on one or more of the witness articles 125. This may allow controlled destruction of the witness articles 125 without adversely affecting the validation articles 115. Still, there may be instances in which one or more validation articles 115 are subjected to some or all of the destructive testing.

Many different types of testing are possible according to various validation protocols 145. In certain implementations, the testing devices are capable of data collection through an internal computer-controlled feedback loop and provide a digital raw data analysis of the results using metrics-based analysis software. In one embodiment, a pin-on-disc or pin-on-plate testing device is used for testing of the witness articles 125 as part of the validation system 140. The device may provide functional testing of wear, friction, fatigue, and/or strain. In some cases, such a device provides constant downward servo pressure during the test sequence, as well as control of various speed, pressure, distance, and rate of pin feed dynamic load. Certain contexts may further involve compliance with test standards. For example, this type of testing may be required to meet the ASTM G99-05 Test Standard for output data. In one embodiment, processed witness articles 125b are physically tested for improvement in wear characteristics by using a pin-on-disc or pin-on-plate tribological test device according to one or more of the ASTM G99-03, G99-05, or DM-50324 standards, and statistical results of wear rate, depth, volume loss and/or profile are acquired, compared and contrasted against those of the control group of raw witness articles 125a.

According to another embodiment, a potentiodynamic polarization testing device is used as part of the validation protocol 145, for example, to determine corrosion rate, susceptibility of certain materials for corrosion in a designated environment, and/or measurement of electrochemical bonding capability. Some such devices are capable of cyclic polarization tests to evaluate pitting susceptibility. In certain implementations, validation protocols 145 for such a device include a potentio-staircase, electrochemical potentiodynamic reactivation, linear polarization resistance, and/or other techniques, for example, to incorporate testing on stainless and other alloy steels. As mentioned above, additional testing standards may be involved. For example, such a device may be required to meet the ASTM G61-86 Test Standard for output data. In one embodiment, processed witness articles 125b are comparison tested for reduction in corrosion effect using potentiodynamic polarization testing according to the ASTM G61-86 or ASTM F2189-08 standards to assess both fretting and pitting corrosion as well as electrochemical bonding effect (e.g., according to ASTM G150), and the statistical results are acquired, compared and contrasted against those of the control group of raw witness articles 125a.

According to yet another embodiment, a three-dimensional, white-light, interferometric testing device is used as part of the validation protocol 145, for example, to determine surface finish, analyze surface topography, and/or detect corrosion. Some implementations use a single coherent light source split by a grating or partial mirror (beamsplitter) and have Fourier transform analysis capability. Certain such devices use vertical scanning through objectives to capture a three-dimensional surface height map at or better than 0.0000025-inch (or 63.5 nanometer) repeatable accuracy. As mentioned above, additional testing standards may be involved. For example, such a device may be required to meet the ASTM E289-04 or ASTM E2244-05 Test Standard for output data. In one embodiment, processed witness articles 125b are comparison tested for improvement in corrosion effect and surface finish using such interferometry to assess surface texture parameters, including, but not limited to Rk, Rpm, Rv, Rp, R3z, Rmr, Rz, RzDIN, Ra, Rmax, and the statistical results are acquired, compared and contrasted against those of the control group of raw witness articles 125a.

Regardless of the types of testing apparatus or protocols that are applied, the outputs from those tests are considered witness results 155. In some embodiments, the witness results 155 are used directly to validate the validation articles 115. For example, the witness results 155 from one or more tests dictated by the validation protocol 145 may indicate a value of a characteristic of one or more witness articles 125, or a change in a characteristic value between the raw witness articles 125a and the corresponding processed witness articles 125b. The validation articles 115 can then be directly validated from those witness results 155.

Alternatively, the witness results 155 generated from the tests may be further processed to generate additional witness results 155 for use in validation of the validation articles 115. In some embodiments, a computer-implemented analysis is performed with respect to parametric linkages among the witness results 155 data. For example, raw data from tribological, interferometric, and potentiodynamic polarization testing of raw witness articles 125a (e.g., or one or more witness articles 125 designated as a control group) is entered in software templates to establish baseline characterizations of various material qualities (e.g., the same or different qualities as the validation article properties 105). Data results taken from testing of the processed witness articles 125b will contrast to the baseline data and form the scope and range of improvement. Statistical analyses are then used to generate additional witness results 155. In some implementations, the analytical results are displayed using one or more visualization techniques (e.g., histograms, Gantt charts, bar charts, Venn diagrams, Pareto diagrams, etc.).

Some implementations quantify a percentage increase in specific wear, corrosion, and/or electrochemical performance attributes. This improvement percentage may reflect a quantitative increase as sampled and measured using the test equipment and other components of the validation system 140. Notably, improvement numbers and/or other witness results 155 may not be a guarantee of measurable performance or life span increase due, for example, to potentially limited scope of test and evaluation, or potentially limited context of the validation articles 115 as components of a larger sub-assembly, assembly, sub-system, system, or platform, etc. Further, while expectations of usage environments may be captured in the testing and analytics, the validation may not be able to account in all cases for subsequent failures of an article due to misuse, overuse, failure of adjacent components, neglect, catastrophic failure outside of the purview of the tests, etc.

Embodiments of the witness results 155 quantify and contrast material wear, corrosion, and electrochemical bonding gains against both baseline data reported in a control group (as described above) and/or against known standard references. Objective gains can then be scored in terms of either or both of absolute and incremental improvements. In certain embodiments, validation involves a "go/no go" evaluation, measured against minimum improvement thresholds. For example, if the witness results 155 indicate that the witness article 125 material properties exceed minimum parameters assigned to according to the validation protocol 145 to validate that cryogenic processing improvement in wear, corrosion and electrochemical bonding effect have occurred, a positive validation of the validation articles 115 is generated. In some cases, the validation includes documentation, which may or may not include specific portions of the witness results 155 and/or other useful information (e.g., the processing protocols 135, validation article properties 105, validation protocols 145, etc.).

Subsequent to validation, it is convenient to consider the status of the validation articles 115 as changing from processed validation articles 115b to validated validation articles 115c, even though the validation articles 115 may not have changed in any way. The validation (e.g., according to the witness results 155 and associated analytics) can be used to validate that the validation articles 115 have undergone cryogenic processing according to a particular processing protocol 135. Additionally or alternatively, the validation can be used to validate that the validation articles 115 manifest certain metallurgical, electrochemical, wear, and/or other characteristics.

In some embodiments, the validation is used to certify the validated validation articles 115c as validation articles 115d. As illustrated, the certification may be implemented by a certification system 150 according to one or more certification protocols 165 and using data maintained in a certification data store 160. For example, the certification system 150 includes computer-controlled analysis software that analyzes the witness results 155 to determine whether certain metallurgical, dimensional, and/or other characteristics of the certified validation articles 115d are within some predefined tolerance (e.g., in accordance with a regulation, contractual obligation, etc.). Previously certified data, data from previous validations, statistical data, and/or any other data may be retrieved from the certification data store 160 and used as part of the analysis according to the certification protocols 165. As described more fully below, the certification may include military-recognized or other pre-negotiated certification documentation.

It is noted that functionality of the various systems and systems components described above can be implemented in any useful way without departing from the scope of those embodiments. For example, functionality described herein may be implemented in hardware, software, firmware, or any combination thereof. If implemented in software, the functions may be stored as one or more instructions on a tangible, computer-readable medium. A storage medium may be any available tangible medium that can be accessed by a computational system. By way of example, and not limitation, such computer-readable media can comprise RAM, ROM, EEPROM, CD-ROM, or other optical disk storage, magnetic disk storage, or other magnetic storage devices, or any other tangible medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, a computer program product may perform operations presented herein. For example, such a computer program product may be a computer readable tangible medium having instructions tangibly stored (and/or encoded) thereon, the instructions being executable by one or more processors to perform the operations described herein. The computer program product may include packaging material. Software or instructions may also be transmitted over a transmission medium. For example, software may be transmitted from a website, server, or other remote source using a transmission medium such as a coaxial cable, fiber optic cable, twisted pair, digital subscriber line (DSL), or wireless technology such as infrared, radio, or microwave.

Additionally or alternatively, functionality can be performed using one or more general purpose processors, digital signal processors (DSPs), ASICs, field-programmable gate arrays (FPGAs), programmable logic devices (PLD), discrete gate or transistor logic, discrete hardware components, or any combination thereof designed to perform the functions described herein. A general purpose processor may be a microprocessor, processor, controller, microcontroller, state machine, etc. A processor may also be implemented as a combination of computing devices, e.g., a combination of a DSP and a microprocessor, a plurality of microprocessors, one or more microprocessors in conjunction with a DSP core, or any other such configuration.

It will be appreciated that the specific configuration shown in FIG. 1 is intended to be illustrative only. Other embodiments include only some or additional systems, systems that are collocated or physically located at various (e.g., distributed or dispersed) positions, systems that are controlled by multiple parties that may or may not be associated, etc. Further, embodiments may perform functionality in different orders, at different times, by different parties, etc. Accordingly, any embodiments of cryogenic processing environments 100 can be used in whole or in part to perform embodiments of processing, validation, certification, and/or other related functionality described herein.

Embodiments are further described with reference to various methods below. The methods disclosed herein comprise one or more actions for achieving the described method. The method and/or actions may be interchanged with one another without departing from the scope of the claims. In other words, unless a specific order of actions is specified, the order and/or use of specific actions may be modified without departing from the scope of the claims. Further, as discussed above, references to performing aspects of the methods using components of the cryogenic processing environment 100 of FIG. 1 are intended to be illustrative, and should not be construed as limiting the scope of those methods.

Figure 2:
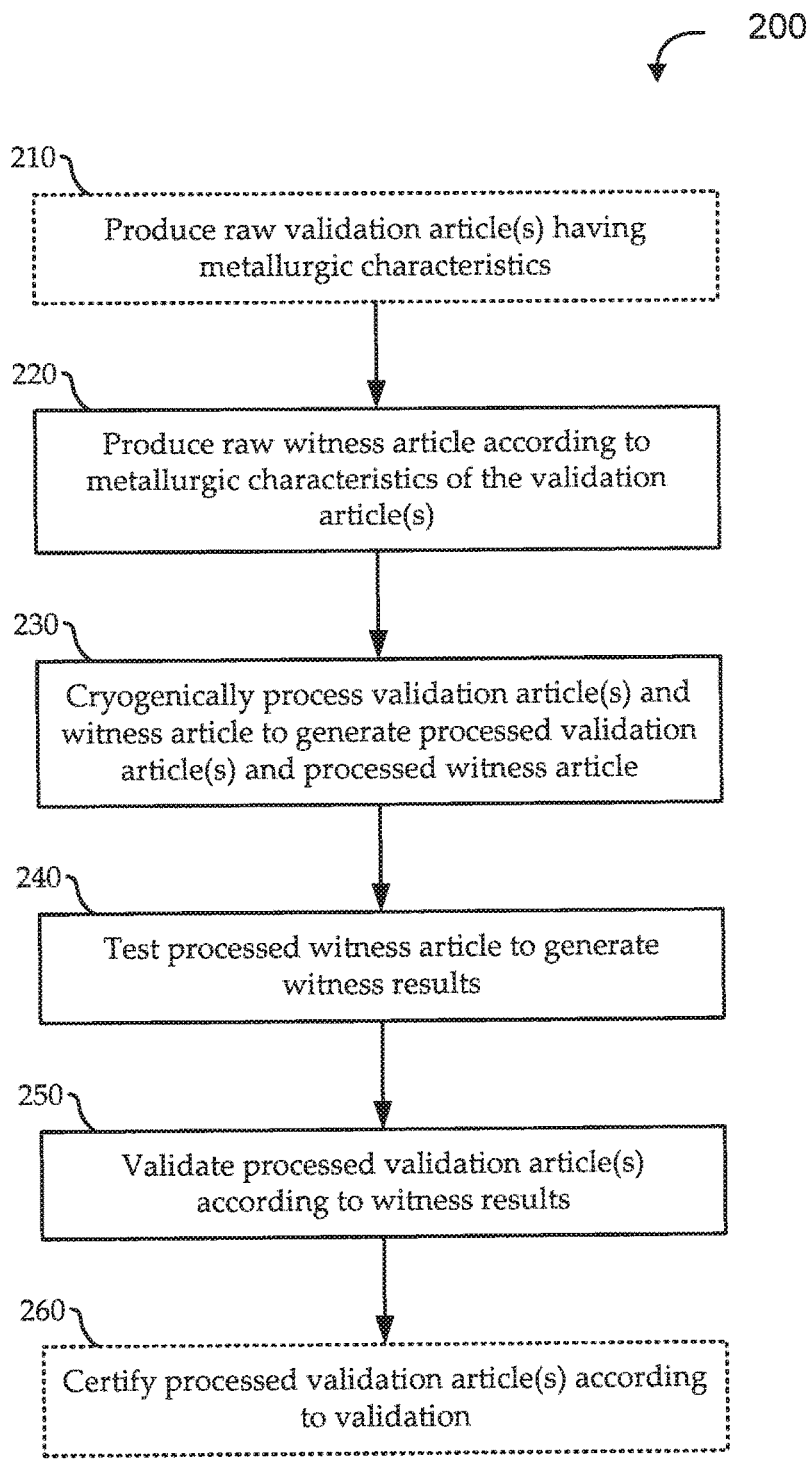
FIG. 2 shows a flow diagram of a method for validation of cryogenically processed articles, according to various embodiments.

Turning to FIG. 2, a flow diagram is shown of a method 200 for validation of cryogenically processed articles, according to various embodiments. The method 200 begins at block 210 when raw validation articles 115a are produced having metallurgic characteristics (e.g., and one or more other validation article properties 105). As discussed above, the production of the validation articles 115 may occur separately and prior to the cryogenic processing and validation thereof. Accordingly, the production of the validation articles 115 at block 210 may include manufacturing of the validation articles 115 and/or receipt of previously manufactured validation articles 115.

At block 220, one or more raw witness articles 125a are produced according at least to the metallurgic characteristics of the raw validation articles 115 produced in block 210. For example, the raw witness articles 125 are produced so as to witness relevant changes in characteristics of the validation articles 115 by acting as their analog in downstream testing. Typically, at least certain metallurgical characteristics are shared between the witness articles 125 and the validation articles 115, though additional characteristics may also be shared, such as surface finishes, surface coatings, heat treatments, geometric constraints, etc.

Figure 3A:
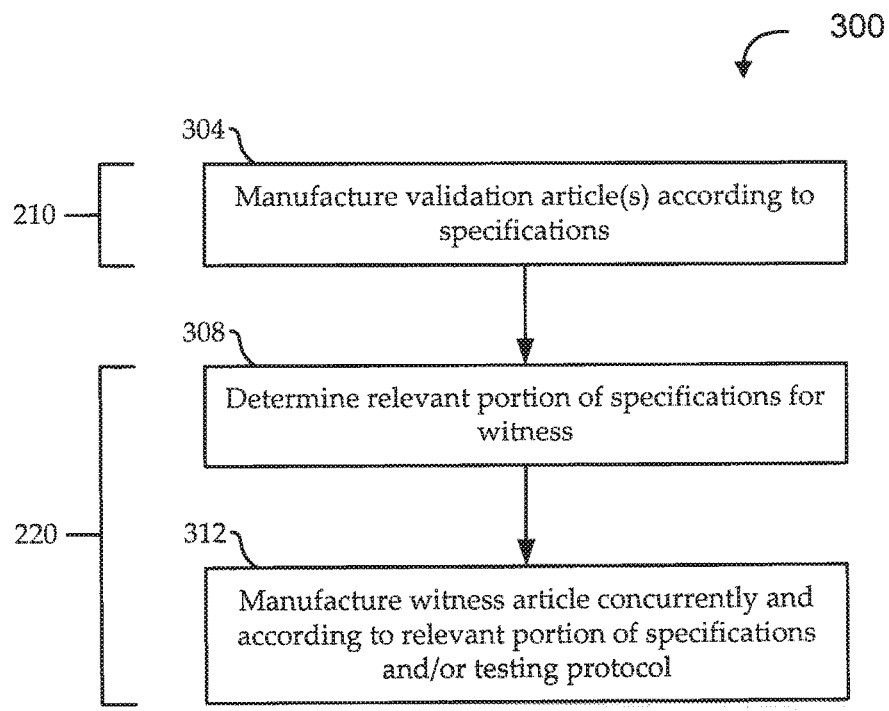
FIG. 3A shows a flow diagram of a method for producing witness articles in a shared manufacturing context with the production of validation articles.
Figure 3B:
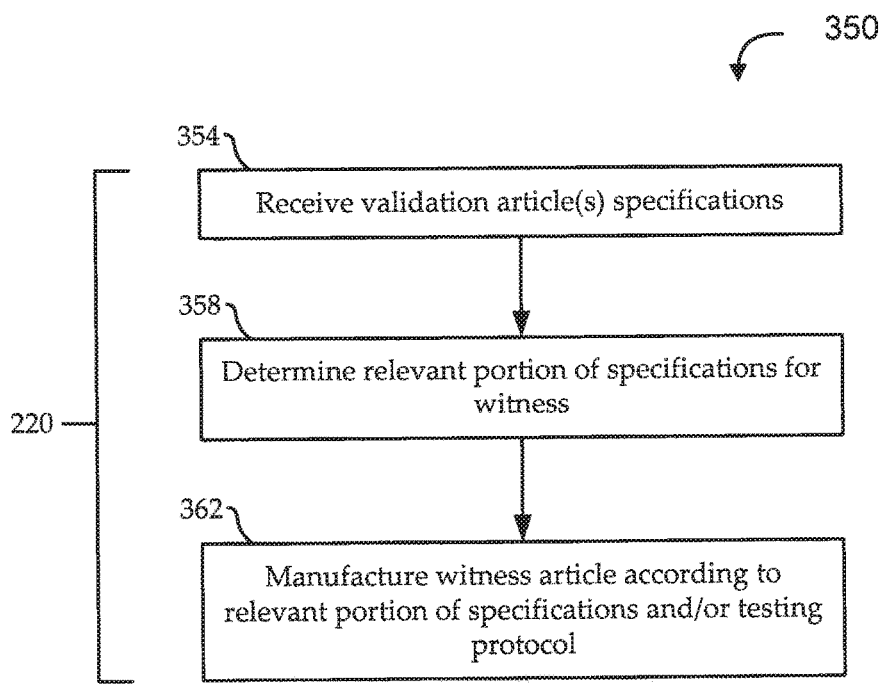
FIG. 3B shows a flow diagram of a method for producing witness articles when validation articles are procured from a separate manufacturing context.

Some embodiments of methods for implementing the production of witness articles 125 are illustrated by FIGS. 3A and 3B. FIG. 3A shows a flow diagram of a method 300 for producing witness articles 125 in a shared manufacturing context with the production of validation articles 115. The method 300 begins at block 304 (e.g., illustrated as an embodiment of block 210 of FIG. 2) when the validation articles 115 are manufactured within the context of the cryogenic processing environment 100 (e.g., by the article generation system 110). The validation articles 115 are manufactured according to defined specifications, resulting in particular validation article properties 105 associated with the validation articles 115.

Blocks 308 and 312 are illustrated as embodiments of block 220 of FIG. 2. At block 308, a relevant portion of the specifications by which the validation articles 115 were manufactured in block 304 are selected. This selection may correspond to (or be implemented as) a selection of some or all of the validation article properties 105. The relevant portion that is selected is determined in order to ensure that any witness articles 125 produced according to those specifications will be sufficiently useful as a witness to the cryogenic processing of the validation articles 115. For example, it may be determined that material (e.g., stock) characteristics must be maintained, even if the witness articles 125 are manufactured with different (or no) surface treatments or coatings, with different geometries, with different pre-processing (e.g., heat treatments, etc.), etc. In other cases, it may be determined that the witness articles 125 must be manufactured with at least one common dimension (e.g., a minimum cross-sectional dimension), with a common surface treatment or coating, etc.

At block 312, the witness articles 125 are produced according to the selected relevant portion of the specifications. In some embodiments, producing the witness articles 125 involves selecting the witness articles 125 from a set of previously manufactured articles having varying characteristics. In other embodiments, the witness articles 125 are manufactured concurrently with and using the same manufacturing process as the validation articles 115. In still other embodiments, the witness articles 125 are manufactured in a way that shares only a portion of the manufacturing process used for the validation articles 115. For example, the witness articles 125 may be cut from the same stock as the validation articles 115, but the validation articles 115 are then subjected to shaping (e.g., milling, bending, pressing, etc.), heat treatment, surface finishing, and/or other processes not performed on the witness articles 125.

It will be appreciated that some embodiments described herein are tailored for use in a military context. For example, heat treatments of articles may include annealing, air hardening, austempering, case hardening, carburizing, decarburizing, flame hardening, martempering or marquenching, nitriding, normalizing, oil hardening, quenching and tempering, water hardening, etc. Parts may further be treated to reduce or prevent surface or subsurface corrosion, delamination, abrasion, or material degradation using the processes of chrome, nickel or zinc plating, manganese phosphate, zinc phosphate, anodizing, electrodeposit, or electroplating, CARC paint, oxidizing, boronitriding, cold/plasma/fusion spray, Bodycote DLC, or application of organic or non-organic, single or multi-stage compounds. Parts may even be further treated by single-, double-, or triple-tempering, snap-tempering or annealing, etc. In any or all of these cases, military-compliant documentation may be generated certifying or indicating that the processing occurred FIG. 3B shows a flow diagram of a method 350 for producing witness articles 125 when validation articles 115 are procured from a separate manufacturing context. For example, in many instances, the articles being cryogenically processed were manufactured by the same or a different facility (e.g., they are legacy parts) either immediately prior or appreciably prior to receipt at the cryogenic processing environment 100. Accordingly, the entire method 350 is illustrated as being an embodiment of block 220 of FIG. 2, without a reference to producing the article per block 210 of FIG. 2.

The method 350 begins at block 354 by receiving validation article specifications. As discussed above, the validation articles 115 are manufactured according to defined specifications, resulting in particular validation article properties 105. These validation article properties 105 can be maintained as records associated with the validation articles when they are received (e.g., as part of the procurement or other logistical process). Some or all of the relevant validation article properties 105 can alternatively, in some cases, be received through direct observation (e.g., testing, measurement, etc.) of the received validation articles or in any other useful way.

The method 350 may then proceed in a substantially similar way to that of the method 300 of FIG. 3A. At block 358, a relevant portion of the specifications by which the validation articles 115 were manufactured in block 304 is selected to ensure that any witness articles 125 produced according to those specifications will be sufficiently useful as a witness to the cryogenic processing of the validation articles 115. At block 362, the witness articles 125 are produced (e.g., selected, manufactured, processed, procured, etc.) according to the selected relevant portion of the specifications.

Returning to FIG. 2, at block 230, the raw validation articles 115a and raw witness articles 125a are cryogenically processed to generate processed validation articles 115b and processed witness articles 125b. As discussed above, the cryogenic processing may involve various ramp down, soak, ramp up, tempering, and/or post-processing stages. An illustrative flow diagram of a method 400 and a profile diagram 500 for cryogenic processing of a material according to various embodiments are shown in FIGS. 4 and 5, respectively.

Figure 4:
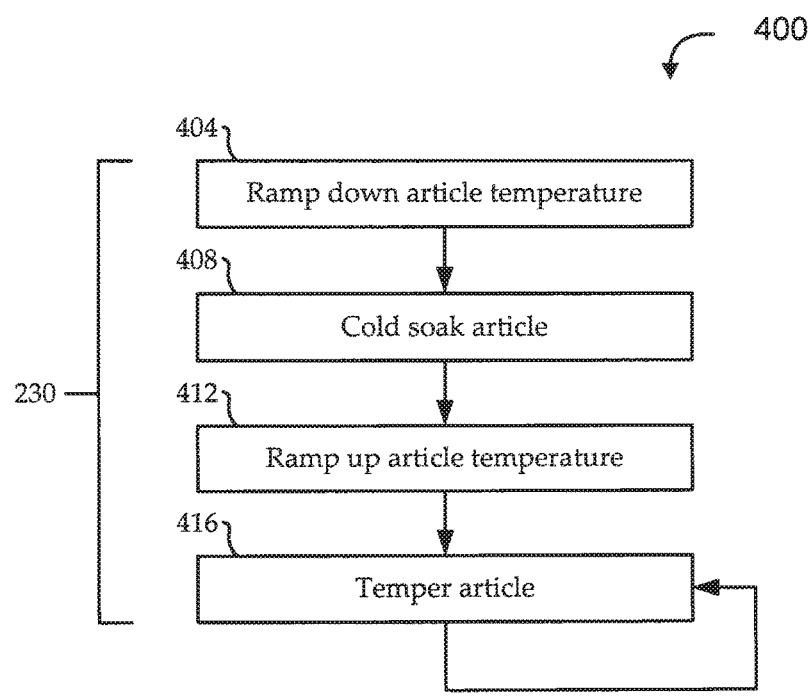
FIG. 4 shows an illustrative flow diagram of a method for cryogenic processing of a material, according to various embodiments.
Figure 5:
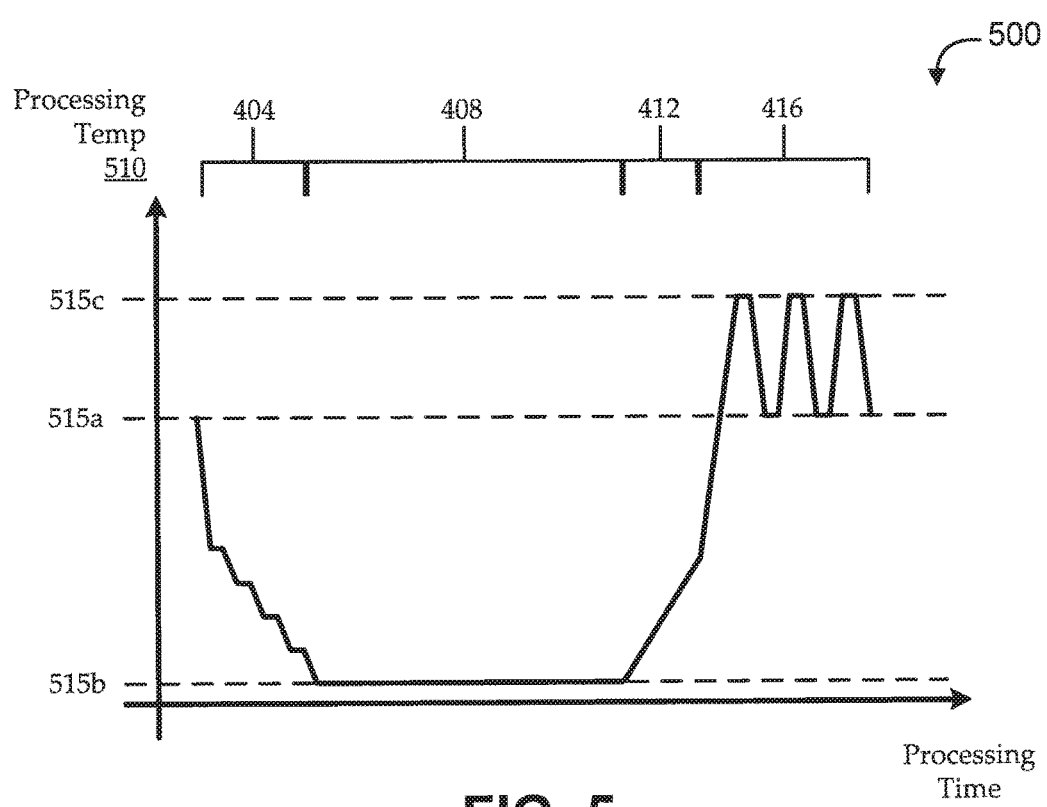
FIG. 5 shows a profile diagram corresponding to an embodiment of a processing profile.

The method 400 of FIG. 4 begins at block 404 by ramping down the temperature of the article (e.g., some or all of the validation articles 115 and/or witness articles 125). Typically, the article temperature is affected by either immersing the article in a cryogenic liquid, immersing the article in vapors from a cryogenic liquid, moving the article into proximity of either a cryogenic liquid or vapor, or placing the article in a chamber that is cooled by one of the other techniques. In some implementations, cryogenic material is used, and the temperature of the article is reduced according to the temperature of that cryogenic material.

Though many of the techniques described herein could be used with various types of cryogenic processing, many features discussed with reference to embodiments assume so-called "deep cryogenic," or "deep cryo" processing. Deep cryo techniques use a cryogenic liquid, like liquid nitrogen, liquid helium, liquid argon, or other cryogens, to reduce the temperature of the article to around negative −300-degrees Fahrenheit (e.g., −300° F., −320° F., −327° F.). Notably, as the temperature may be based on the boiling point of the cryogenic material being used, the temperature may be affected by externalities, such as altitude. Further, some embodiments work with so-called "shallow" cryogenic processing. Shallow processing uses liquid nitrogen, dry ice, refrigeration, or the like to reduce the ambient temperature to an appreciably less cold low temperature (e.g., −60° F.) in order to achieve a partial or complete change in mechanical, electrical, physical or chemical characteristics, which may be similar to those discussed with reference to deep cryogenic processing.

The rate of temperature may be controlled in different ways according to different processing protocols. For example, the temperature may be reduced gradually, stepwise, incrementally, etc. In one implementation, the temperature is reduced over a shorter period of time (e.g., 2-4 hours), while in another implementation, the temperature is reduced over a longer amount of time (e.g., 8-14 hours, more than 24 hours, etc.). Some embodiments reduce the temperature in stages. For example, a first stage suspends the articles near the cooling liquid to reduce the temperature of the material to around −200° F. over 3-24 hours; a second stage suspends the articles near the cooling liquid to reduce the temperature of the material to around −280° F. (i.e., where the material may no longer be susceptible to thermal shock) over 1-12 hours; and a third stage (e.g., a pre-soak stage) partially or completely immerses the articles in cooling liquid to reduce the material temperature to around −300° F. over 0.5-13 hours.

At block 408, the articles are subjected to a cold soak stage, during which the material temperature of the articles is maintained at a substantially constant level for a period of time. Various embodiments either wet soak or dry soak the articles to maintain their material temperature. For example, soaking the article in either liquid nitrogen or its vapor may maintain the article at substantially −320° F. Various techniques maintain the temperature for different amounts of time (e.g., 5-10 hours, 24-60 hours). In some implementations, the timing is a function of a characteristic of the articles undergoing cryogenic processing. For example, the cold soak time may be determined as a time that is less than or equal to a minimum cross-sectional dimension of a validation article 115 times ten minutes, whatever amount of time it takes for bubbling to cease, etc.

At block 412, the material temperature of the articles is ramped up. In some implementations, the ramp up profile is substantially a mirror of the ramp down profile used for block 404. Various implementations increase the material temperature actively (e.g., by heating the material in an oven or otherwise increasing the temperature of the processing chamber) and/or passively (e.g., by letting the cryogenic liquid boil off). Typically, the material temperature is returned (or allowed to return) to ambient (e.g., 68° F.-70° F.) over some predetermined amount of time (e.g., 8-46 hours, 12-20 hours, etc.), over whatever time it takes to return to that temperature passively, or over an amount of time dependent on characteristics of the articles (e.g., over a time that is less than or equal to ten minutes plus the product of a minimum cross-sectional dimension and 10 minutes). Embodiments of the ramp up profile may also involve stages. For example, a first stage involves increasing the tank temperature to −50° F. over 11-16 hours; and a second stage involves placing the articles in an ambient environment and allowing their material temperature to rise over about 3 hours.

Some embodiments avoid actively ramping up the temperature and prefer to passively allow the temperature to increase to ambient. For example, the introduction of warmer outside air can immediately cause condensation and precipitation of surface rust. Rather, embodiments place (or keep) the validation articles 115 in a contained vacuum environment through which thermodynamic equilibrium can be achieved over time.

Embodiments set different treatment profiles for blocks 404-412 according to various parameters. For example, each of the ramp down, cold soak, and ramp up time and/or temperature curves can be set according to predetermined functions. In various embodiments, the functions are based on validation article properties 105 (e.g., material alloy type, volume and mass of the validation articles 115 being treated, mixed alloy load constraints, etc.), desired performance characteristics, etc.

In some embodiments, one or more tempering stages are performed at block 416. Tempering has been shown to reduce embrittlement of higher martensite content in deep-cryo-treated steel (i.e., that was formerly arranged as retained austenite). For example, the process can cause conversion from a face-centered lattice into a body-centered tetragonal structure. The body-centered tetragonal structure can typically have fewer openings that promote intragranular corrosion or interstitial defects to initiate fatigue cracking.

Embodiments of a tempering stage may include temper ascent, temper hold, and temper descent sub-stages. The temper ascent sub-stage may involve increasing the tank temperature or heating the articles in an oven to some high temperature level (e.g., +300° F., +330° F., +370° F., etc.) over a predetermined time or over whatever time it takes for the material temperature to reach the predetermined high temperature level. The temper hold sub-stage may involve maintaining the articles substantially at the high temperature level for an amount of time (e.g., 0.5-2 hours). The temper descent sub-stage may involve decreasing the tank temperature or removing the articles from heat to return the article material temperature to some lower level (e.g., ambient) over a predetermined time or over whatever time it takes for the material temperature to reach the desired level. In some implementations, the tempering phases are repeated one or more times.

For the sake of illustration, FIG. 5 shows a profile diagram 500 corresponding to an embodiment of a processing profile. The profile diagram 500 illustrates material temperature 510 of the articles undergoing processing versus the processing time 520. The profile diagram is intended to be illustrative only, and is not intended necessarily to show scale on either axis. Brackets are used to correlate the blocks described with reference to FIG. 4 with the stages of the processing profile.

As illustrated, the articles start processing at some ambient first temperature 515a. Over a ramp down phase (e.g., per block 404), the material temperature 510 is reduced, first gradually and then in step-wise fashion, to a low second temperature 515b. Over a cold soak phase (e.g., per block 408), the material temperature 510 is held substantially at the low second temperature 515b. Over a ramp up phase (e.g., per block 412), the material temperature 510 is increased, first gradually and then more rapidly, to the first ambient temperature 515a. Three tempering cycles are then shown (e.g., per block 416), over each of which the material temperature 510 is increased to a high third temperature 515c, held at the high third temperature 515c, and returned to the ambient first temperature 515a.

Returning again to FIG. 2, at block 240, the processed witness articles 125 are subjected to destructive and/or non-destructive testing to generate witness results 155. As discussed above, additional witness results 155 may be generated using computer-controlled parametric analysis and/or other statistical and data processing techniques. Further, in some embodiments, only a portion of the raw witness articles 125a is processed at block 230, and another portion of the raw witness articles 125a is maintained as a control group. Accordingly, at block 240, the testing may involve comparing testing results and/or characteristics of the processed witness articles 125b and the control group raw witness articles 125a.

The witness results are then used to validate the processed validation articles 115b at block 250. In some embodiments, the validation of the validation articles 115 is dependent only on the results of testing of the witness articles 125 at block 240. In other embodiments, additional testing (e.g., non-destructive testing) is performed on some or all of the validation articles 115. The validation at block 250 may, then, be dependent on both the witness results 155 and the additional validation article 115 testing. Subsequent to validation, the processed validation articles 115b can be considered as validated validation articles 115c.

In some embodiments, at block 260, the validated validation articles 115c are certified according to the validation, thereby becoming certified validation articles 115d. In some embodiments, certification involves generating documentation to certify that the articles have undergone particular cryogenic processing. In other embodiments, certification involves generating documentation to certify that the articles manifest certain metallurgical or other characteristics (e.g., as an absolute measurement, as a scale, as a score, as within a tolerance, in relation to a pre-processed value, in relation to other similarly-processed articles, etc.). In still other embodiments, certification involves generating documentation to certify additional information, such as analytics. Some embodiments of certification are discussed more fully below.

Certification of Cryogenically Treated Materials for Military Use

Embodiments described above can be applied in both military and non-military contexts. However, it will be appreciated that military uses of materials involves specific certification processes and requirements. Some embodiments are described more fully below with a focus on considerations for use in military contexts. Specific reference is made to the United States military, though it will be appreciated that similar techniques may be applicable in the context of other commercial and/or non-commercial contexts (e.g., another country's military, military support services, private security forces, etc.).

Tanks, ships, planes, armament, munitions and weaponry are several well recognized platforms that are comprised of discrete parts, sub-assemblies, assemblies and system level items manufactured or formed from metal and metal-matrix materials. Most system and platform level equipment has limited lifespan due, for example, to mechanical, electrical, chemical or physical breakdown of one or more critical components. Due to common environmental operation in adverse conditions during operation, this breakdown is often ascribed to wear effect, corrosion or surface finish degradation or a combination thereof.

In efforts to combat varying manufacturing techniques that might yield a sub-optimum performance item, specific manufacturing standards, like MIL-STDs and other detailed procedures typically flow down in contracts awarded to suppliers of these items to govern production, quality, inspection, acceptance, etc. These procedures may, in some cases, be certified (e.g., verified, etc.) by one or more authorized government quality assurance representatives (QARs).

Although many standards and procedures exist for manufacturing methods used in production of metal-matrix parts supplied to the military, none of these standards or procedures explicitly governs cryogenic processing and/or validation or metal-matrix articles for military use. For example, there is no MIL-STD, procedure, special process initiative, or engineering document that describes, outlines, or covers cryogenic processing or cryogenic treatment of metal parts, used in any form or application by the U.S. military, for the purpose of improving wear performance, corrosion resistance, imparting improved mechanical attributes or increasing electrochemical bonding.

As discussed above, cryogenic treatment according to the above embodiments (e.g., and, in particular, deep cryo processing) can yield a number features. Exposure of materials to deep cryo processing cause permanent and irreversible changes to metal microstructures. These changes can manifest increased mechanical properties (e.g., due to temperature-induced order in the metal lattice), increased atomic packing density, retarded abrasive wear and surface or sub-surface delamination, reduced crack initiation and formation, etc. The effects have been shown to be even more dramatic in single-phase (as opposed to dual-phase) alloys, though cryogenic attributes responsible for transformations differ based on each alloy. Notably, embodiments of cryogenic processing described above can work, regardless of whether the parts being treated are in billet, cast, sintered, forged, machined, or some other form.

Because cryogenically treated items demonstrate these and other features (e.g., including increased wear and corrosion resistance), they can extend the operation of critical defense items during time of war, reduce the risk of loss of a soldier's life during operation of combat weaponry, increase the useable lifespan and functional uptime of legacy naval, air and land systems, and lower sustainment expense and total cost of ownership across almost all metal operational platforms within the US military. However, the lack of existing, accepted techniques for validation and/or certification of cryogenic processing for military use has apparently limited the use of cryogenic techniques in those contexts.

Embodiments provide different types of certification. In some embodiments, certification is against a cryogenic processing contract (e.g., a military or commercial contract). A set of output material targets is identified from provisions of the cryogenic processing contract, which indicates desired metallurgic characteristic values of a metal-matrix treatment article to be achieved by cryogenic processing of the treatment article. For example, the desired metallurgic characteristics can include certain hardness, corrosion resistance, etc. In some cases, the metallurgic characteristics are derived from performance characteristics indicated in the contract (e.g., relationships are developed or known between increased tensile strength and operational life of a particular type of article).

Having identified the desired output material targets, an appropriate processing protocol can be generated by which to perform cryogenic processing of the treatment article to achieve the set of output material targets, and an appropriate validation protocol can be generated by which to validate achievement of the set of output material targets from cryogenic processing of the treatment article. In some implementations, these protocols are generated to be military-acceptable or otherwise acceptable by some third-party oversight entity. For example, the protocols are selected from pre-certified protocols, tailored in pre-approved ways, etc.

The treatment articles can then be cryogenically treated and validated according to the generated protocols. For example, as described above, witness articles can be used as a proxy to provide witness results from destructive and/or non-destructive testing. As described more fully below, certification documentation can then be generated to certify cryogenic treatment of the validation article according to results of the validating step and provisions of the cryogenic processing contract.

Figure 6:
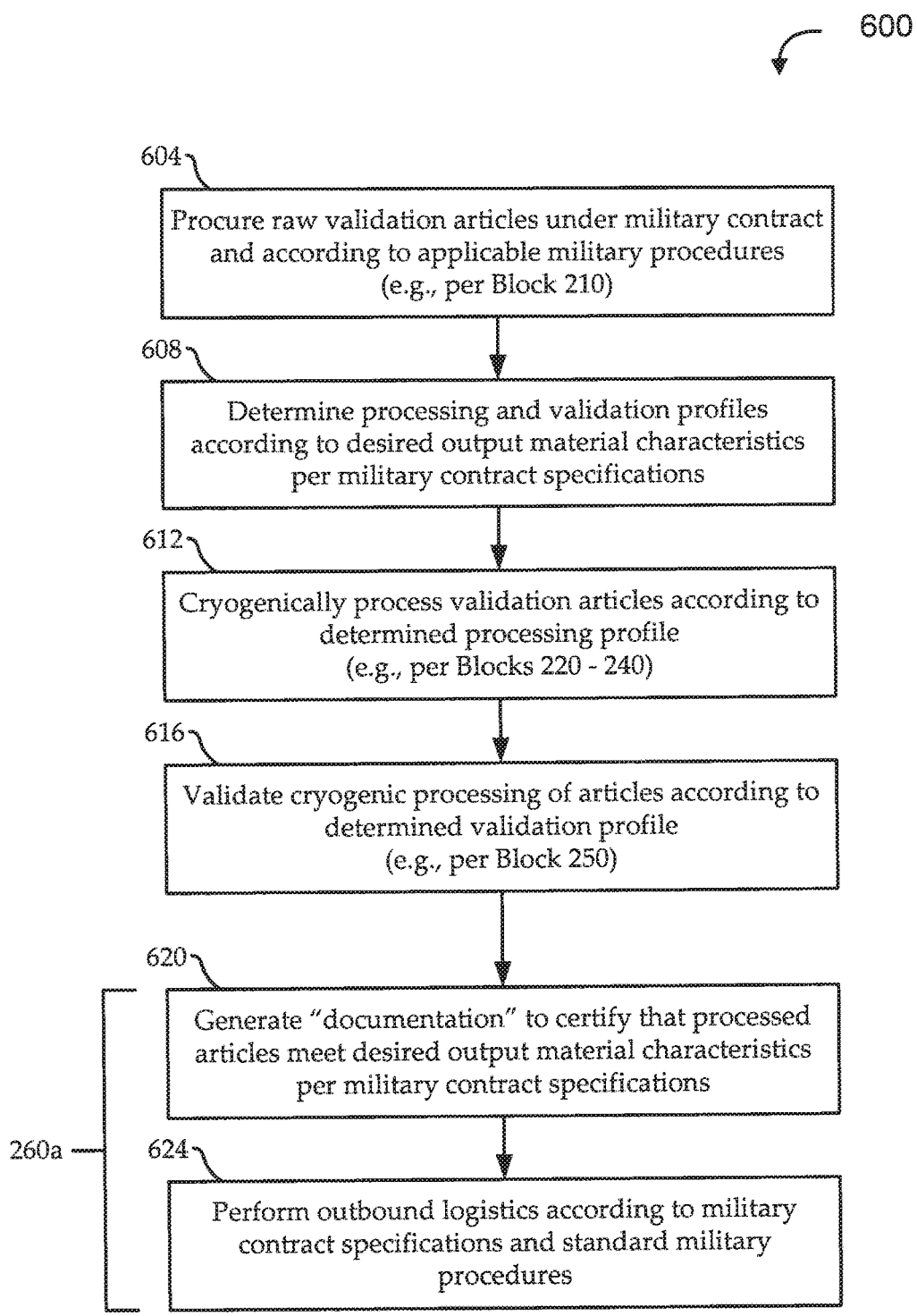
FIG. 6 shows a flow diagram of an illustrative method for certification of cryogenically treated parts for military use, according to various embodiments.

Turning to FIG. 6, a flow diagram is shown of an illustrative method 600 for certification of cryogenically treated parts for military use, according to various embodiments. The method 600 begins at block 604 by procuring the raw validation articles under an applicable military contract and according to applicable military procedures. It is worth noting that the "certification" process can be considered as beginning all the way at or before the procurement stage of block 604. For example, some embodiments of the procurement are implemented according to block 210 described above with reference to FIG. 2 (e.g., by receiving and/or manufacturing validation articles 115). However, these and other embodiments include additional procurement functionality to support later certification of the validation articles 115 for military use.

For example, incoming items may be received and documented as to kind, count, and quantity for documented receiving inspection recording. This data might also include national stock number (NSN), part nomenclature, description, and comments on any shipping, marking, or packaging damage at the time and point of receipt. The items may then be physically unpackaged, and both the items and documents may be inspected per any requirement imposed by oversight (e.g., DCMA) personnel. According to certain embodiments, all supplied material are traceable to a heat and a lot of an ITAR-compliant material alloy supplier, a chemical/physical material certification is made available for DCMA QAR inspection, and all documents are retained or archived on-site as per an applicable ISO standard governing the production facility.

In some embodiments, items are staged in an appropriate queue for upcoming cryogenic treatment. The staging may be implemented according to order received, contract priority, or in any other useful way. Certain embodiments include an advanced inventorying system that can batch parts according to processing optimization determinations. For example, the inventorying system may determine that a certain subset of parts in inventory, though disparate in geometry and/or other characteristics, can be processed together to produce desired witness results for those parts. The inventorying system may then be able to further optimize batches for processing to maximize usage of space within a processing chamber or other facility resources.

For the sake of illustration, suppose that a batch of military parts is received at a cryogenic processing facility (e.g., a system like the one illustrated in FIG. 1). Some of the parts are tagged with a radio frequency identification device (RFID) affixed by the military depot that sent the parts. Other parts may be accompanied by various kinds of identification, paperwork, etc., and/or they may be received under particular contracts. These various information sources could be used by a Defense Contract Management Agency (DCMA) inspector, for example, to validate the received parts. Depending on the inspector's findings, there may be no need to re-qualify certain previously produced items if they had already been accepted into the military at the original acceptance date, absent some additional contract for processing, or the like.

At block 608, processing and/or validation profiles are determined according to desired output material characteristics per military contract specifications and/or other pre-inspection determinations. In some embodiments, documentation accompanying or associated with the parts can be used to determine processing and/or validation profiles according, for example, to manufacturing methods, DCMA acceptance intervals, blueprint notes or prescribed military standards (MIL-STDs), contract data requirements lists (CDRLs), document summaries, technical data package lists (TDPLs), etc. Similarly, validation (e.g., and ultimate certification) profiles can be determined by part documentation and/or reference test methods (e.g., dictated by the DCMA quality assurance review (QAR) personnel and procedures), validation and certification guidelines described in applicable MIL-STDs, procedures or guidelines drafted by overseeing military engineering process approval organizations (e.g., Armament Research, Development and Engineering Center (ARDEC), Tank Automotive Research, Development and Engineering Center (TARDEC), etc.), etc.

Certain embodiments of the part documentation include specific processing and/or validation profiles, and those profiles are followed at block 608, accordingly. Other embodiments of the part documentation include part descriptions (e.g., metallurgical characteristics, etc.), and profiles are developed according to those descriptions. For example, processing and/or validation profiles are developed at least partly as a function of material type and pre-treatment (e.g., alloy, surface treatments, etc.), part geometry and/or mass, desired results, etc.

Some instances may involve additional considerations. For example, some items may be able to be cryogenically treated while still in the bags in which they were delivered, if the process is designed to improve fatigue cracking or toughness versus strength. If improvements in strength are desired, the bags and packaging may need to be removed to accommodate post-processing. For example, annealing the parts to improve strength characteristics after cryogenic processing may involve subjecting the parts to a 350- to 400-degree heat treatment, which would likely melt the part packaging.

At block 612, validation articles are cryogenically processed according to the determined processing profile. In some embodiments, the processing is carried out according to embodiments described above with reference to blocks 220-240 of FIG. 2. At block 616, cryogenic processing of the articles is validated according to the determined validation profile. In some embodiments, the validation is carried out according to embodiments described above with reference to block 250 of FIG. 2. For example, destructive and/or non-destructive testing is performed on witness articles as a proxy for validation of the validation articles themselves. A number of illustrative standards and/or guidelines are provided above that can govern various testing procedures.

In certain embodiments, all heat treatments and/or surface finishing are performed in accordance with government-supplied blueprint requirements and conform to workmanship and guidelines outlined in applicable MIL-STDs, procedures, TDPs, and contract award document requirements. Further, in certain embodiments, dimensional tolerances of all finished items meet print, MIL-STD, ANSI 14.5Y/12579607 GD&T (if specified), manufacturer requirements, contract/award specifications, DCMA performance guidelines for acceptance, or AMS/ASTM standards governing production of the part. Validation of some of these and/or other characteristics of the parts may be performed as part of the validation stage (e.g., at block 616) or as part of the manufacturing or receiving of the parts, where applicable (e.g., at block 604).

At block 620, "documentation" is generated to certify that processed articles meet desired output material characteristics per military contract specifications. The term "documentation" is intended to broadly include any type of certification data associated with the processed (e.g., and validated) articles, for example, including paper and/or electronic documentation located physically with the parts or stored in any location. Various standards or guidelines may be used in developing the documentation. According to some embodiments, the documentation is modeled upon the general format of existing MIL-HDBK-831 Preparation of Test Reports, MIL-STD-105E Sampling Procedures for Inspection by Attributes, and/or MIL-STD-1916 DoD Test Method Standards. According to other embodiments, documentation is presented in accordance with formats dictated by the DCMA. Further, embodiments may involve certain archival procedures. For example, embodiments store archival data per ISO or AS quality policy and documents governing the processing facility.

In some embodiments, equipment used in the validation of the articles is certified to be in compliance with necessary applicable ISO, MIL-STDs, ASTM, and/or other quality calibration and test standards. As such, the equipment can be eligible to provide a recognized and military-acceptable First Article Test Certificate for cryogenic treatment of metal and metal-matrix parts. As discussed above, the certified equipment can include any parametric software models and/or modeling applications, pin-on-disc, tribometer, interferometer, potentiodynamic polarization, and/or other testers, and/or other test equipment used in acquisition of validation data (e.g., witness results).

Embodiments include computer-controlled, parametric software that can perform various types of analysis on the witness results from the validation stage. In certain embodiments, the analysis includes storage to and/or comparison with a certification data store. For example, data can be maintained in the certification data store to aid in a determination of whether the witness results manifest a certain performance output (e.g., a change of metallurgical characteristics within some tolerance). The analysis results can be output by the program via a paper or paperless printer, electronic medium or digital, scanned or known facsimile, etc. Certain embodiments of the program archive, preserve, and/or store any analysis or other data (e.g., electronic data) for a period of time specified in a cognizant oversight quality procedure or control system.

The analysis results and/or other data is used to generate a recognized and military-acceptable First Article Test Certificate certifying realization of certain contractual goals. For example, the First Article Test Certificate can certify that certain metallurgical characteristics are present in the witness articles (e.g., and, by proxy, in the validation articles). In some embodiments, the First Article Test Certificate certifies that the validation articles have undergone a particular cryogenic treatment process for metal-matrix parts.

At block 624, outbound logistics are performed according to military contract specifications and standard military procedures. In some embodiments, items are marked, bagged, tagged, military or commercial packaged, and RFID labeled as per the award specification required. Items can then be prepared for shipment subject to DCMA final GSI.

The final packaged and DCMA approved items can then be shipped to their appropriate contract specified location.

It is worth noting that, according to some embodiments, government source inspection is required at any or all steps in the procurement (e.g., production, receipt, verification, etc.) and/or validation stages. In other embodiments, government source inspection is required during certification stages. In still other embodiments, government source inspection is required during outbound logistics stages, for example, including delivery, inspection, and/or acceptance of certified articles.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein may be utilized. Where particular standards, regulations, or the like are mentioned, they are intended only to be illustrative and enabling, and should not be construed as limiting embodiments. Further, any cited standards or the like are intended to include any subsequent revisions, replacements, substitutions, etc. to those standards or the like. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples. Accordingly, the appended claims include within their scope such processes, machines, manufacture, compositions of matter, means, methods, or actions.

What is claimed is:

1. A method for validation of cryogenically treated articles, the method comprising:
   performing destructive testing on a witness article according to a predetermined test protocol to generate witness results subsequent to cryogenic treatment concurrently of the witness article and a treatment article according to a treatment protocol, the witness results comprising a measure of a first metallurgic characteristic of the witness article that is predetermined to undergo, during cryogenic treatment according to the treatment protocol, a first associated enhancement that can be measured only by destructive testing, the witness article produced from a same metal-matrix material as that of the treatment article such that both comprise the metallurgic characteristic, such that the witness results indicate whether the first associated enhancement in the metallurgic characteristic is present in the witness article subsequent to the cryogenic treatment;
   performing non-destructive testing on the treatment article according to the predetermined test protocol subsequent to the cryogenic treatment, the witness results further comprising a measure of a second metallurgic characteristic of the treatment article that is predetermined to undergo a second associated enhancement during the cryogenic treatment, such that the witness results indicate whether the second associated enhancement in the metallurgic characteristic is present in the treatment article subsequent to the cryogenic treatment; and
   validating the cryogenic treatment of the treatment article only when the witness results indicate that the first associated enhancement is present in the witness article and the second associated enhancement is present in the treatment article.

2. The method of claim 1, wherein the cryogenic treatment of the witness article and treatment article according to the treatment protocol comprises:
   ramping down a temperature of the treatment article from an ambient temperature to a low temperature according to a ramp down profile dictated by the treatment protocol;
   cold soaking the treatment article for a duration dictated by the treatment protocol; and
   ramping up the temperature of the treatment article from the low temperature to the ambient temperature to a according to a ramp up profile dictated by the treatment protocol.

3. The method of claim 2, the cryogenic treatment of the witness article and treatment article according to the treatment protocol comprises further comprises:
   tempering the treatment article according to one or more tempering profiles dictated by the treatment protocol.

* * * * *